(12) United States Patent
Huang et al.

(10) Patent No.: US 7,278,140 B2
(45) Date of Patent: Oct. 2, 2007

(54) APPARATUS AND METHOD OF UPDATING DATA OF AN EMBEDDED SYSTEM, AND APPARATUS FOR UPDATING DATA OF MEMORY

(75) Inventors: C. J. Jason Huang, Taipei (TW); Jong-Min Deng, Taipei (TW)

(73) Assignee: Autotools Group Co., Ltd., Taipei (TW)

( * ) Notice: Subject to any disclaimer, the term of this patent is extended or adjusted under 35 U.S.C. 154(b) by 393 days.

(21) Appl. No.: 10/844,988

(22) Filed: May 12, 2004

(65) Prior Publication Data

US 2004/0230969 A1 Nov. 18, 2004

(30) Foreign Application Priority Data

May 12, 2003 (TW) .................................. 92112801

(51) Int. Cl.
*G06F 12/12* (2006.01)
(52) U.S. Cl. ...................... 717/171; 717/168; 711/159; 719/328
(58) Field of Classification Search .................... None
See application file for complete search history.

(56) References Cited

U.S. PATENT DOCUMENTS

| | | | | |
|---|---|---|---|---|
| 5,226,129 A * | 7/1993 | Ooi et al. | .................... | 712/204 |
| 5,835,911 A * | 11/1998 | Nakagawa et al. | ......... | 707/203 |
| 6,446,237 B1 * | 9/2002 | Menon | ........................ | 714/800 |
| 6,463,501 B1 * | 10/2002 | Kern et al. | .................. | 711/100 |
| 6,519,144 B1 * | 2/2003 | Henrie et al. | ................ | 361/686 |
| 7,039,657 B1 * | 5/2006 | Bish et al. | ................... | 707/203 |
| 2004/0031030 A1 * | 2/2004 | Kidder et al. | ................ | 717/172 |
| 2004/0097127 A1 * | 5/2004 | Smith et al. | ................ | 439/533 |

FOREIGN PATENT DOCUMENTS

CN 1297206 A 5/2001

* cited by examiner

*Primary Examiner*—B. James Peikari
(74) *Attorney, Agent, or Firm*—Snell & Wilmer L.L.P.

(57) ABSTRACT

An apparatus and a method for updating data in an embedded system are provided. The apparatus includes a processor for retrieving new data and a transmission line. The transmission line connects to the processor to receive the new data and transmits the new data to the embedded system. The data of a data area has a end address for the data and a plurality of application programs arranged in order, and the new data includes an application program update. The embedded system executes the following steps: searching for an application program corresponding to the application program update; if the corresponding application program is found, retrieving a first address and a second address of the corresponding application program; obtaining a length value of the corresponding application program from the second address and the end address; writing contents of the data area from the second address to the end address into the data area beginning from the first address; adding the first address to the length value to obtain a third address; and writing the application program update into the data area beginning from the third address.

15 Claims, 3 Drawing Sheets

APPARATUS AND METHOD OF UPDATING DATA OF AN EMBEDDED SYSTEM, AND APPARATUS FOR UPDATING DATA OF MEMORY

CROSS-REFERENCE TO RELATED APPLICATION

This Application claims priority to Taiwan Patent Application No. 092112801 entitled "Apparatus and Method for Data Refreshing," filed on May 12, 2003.

FIELD OF INVENTION

The present invention generally relates to a method and apparatus of data updating for an embedded system is provided.

BACKGROUND OF THE INVENTION

Embedded systems, such as information appliances, smart mobile phones and personal digital assistants, are more user-oriented than other consumer electronics. Embedded systems here refer to custom-made systems that combine software and hardware for specific purposes. In the past, when an embedded system needs some update or maintenance, the chip in the system have to be taken out and data has to be rewritten onto the memory of the chip.

However, as the functions of the embedded system multiply, a greater amount of data is stored in the memory, which means more mistakes may occur. Also, to satisfy consumers' demand for value-added functions and new information, the data in the memory needs to be updated more frequently. The conventional way of recycling the chips and re-writing them again is inconvenient for consumers and costly for the producers.

SUMMARY OF THE INVENTION

The present invention provides an apparatus and a method for easily and conveniently updating data in an embedded system. Users can easily correct the information stored in the embedded system and add new functions to it by themselves.

The method of data updating in the present invention includes transmitting the new data to the embedded system via the data transmission line or the peripheral without re-writing all of the data in the memory. This method only has to overwrite part of the data or add the new data to the memory.

Data Updating Apparatus 1

An apparatus for updating data in the memory of an embedded system is provided in the present invention. The apparatus includes a first processor, a transmission line and a second processor. The data transmission line has a first end and a second end. The first end is connected to the first processor and the second end is connected to the second processor. The second processor is connected to the memory. The first processor is used for retrieving new data. The transmission line is used for receiving the new data from the first processor and transmits it to the second processor. The second processor is used for writing the new data into the memory.

The first processor in the present invention can be a computer, and it can retrieve the new data from various sources, including but not limited to, the Internet, optical disks, floppies and other data storage media. The transmission line can be, but is not limited to, an RS232 or a USB transmission line. Both the second processor and the memory are part of the embedded system.

Data Updating Apparatus 2

Another apparatus for updating data in the memory of an embedded system is also provided in the present invention. The apparatus includes a first processor, a transmission line, a peripheral and a second processor. The data transmission line has a first end and a second end. The first end is connected to the first processor and the second end is connected to the peripheral. The peripheral is connected to the second processor. The second processor is connected to the memory. The first processor is used for retrieving new data. The transmission line is used for receiving the new data from the first processor and transmitting it to the peripheral. The peripheral transmits the new data to the second processor. The second processor writes the new data into the memory.

The first processor in the present invention can be a computer, and it can retrieve the new data from various sources, including but not limited to, the Internet, optical disks, floppies or other data storage media. The transmission line can be, but is not limited to, an RS232 or a USB transmission line. The peripheral can be a power charger. Both the second processor and the memory are part of the embedded system.

Data Updating Method

A method for updating data of an embedded system is provided in the present invention. The data has an end address and a plurality of application programs arranged in order. The method includes the following steps: retrieving an application program update; searching for the corresponding application program within the plurality of application programs in the system; retrieving a first address and a second address of the corresponding application program when the corresponding application program is found; obtaining the length value that is the length between the second address and the end address; overwriting the data stored in the area between the first address and the end address; adding the length value to the first address to obtain a third address; writing the application program update into the data area starting from the third address.

In the aforementioned steps, if the corresponding application program is not found, the application program update is written onto the memory starting from the end address.

DETAILED DESCRIPTION

The First Embodiment of the Data Updating Apparatus

Figure 1:
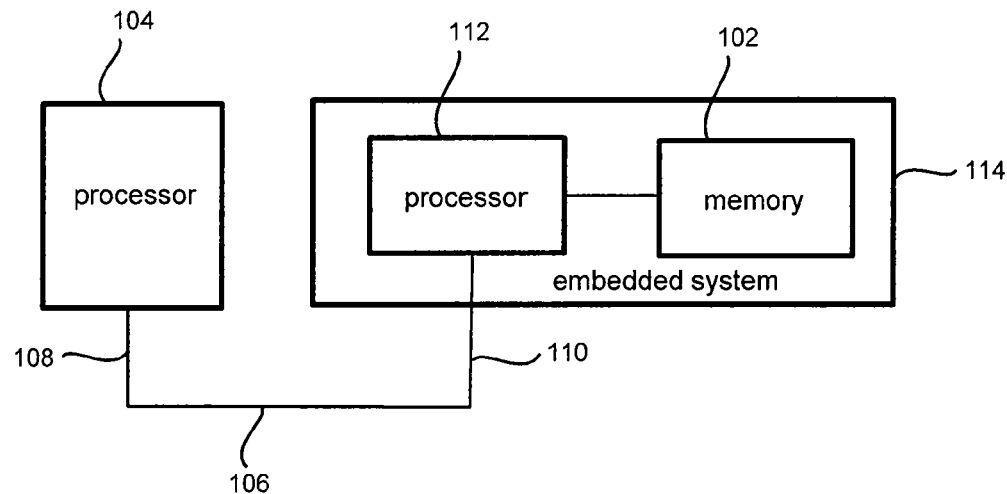
FIG. 1 shows a schematic diagram of the data updating apparatus of the first embodiment in the present invention.

FIG. 1 shows a schematic diagram of the data updating apparatus 100 of the first embodiment in the present invention. The processor 100 updates data in a memory 102. A first processor 104, a transmission line 106 and a second processor 112 are included in the apparatus 100. The data transmission line 106 has a first end 108 and a second end 110. The first end 108 is connected to the first processor 104 and the second end 110 is connected to the second processor 112. The second processor 112 is connected to the memory 102. After the first processor 104 retrieves new data, the new data is transmitted via the transmission line 106 to the second processor 112 and the second processor 112 writes it into the memory 102.

The first processor 104 of the apparatus 100 can be a computer, and it can retrieve the new data from various sources, including but not limited to, the Internet, optical disks, floppies or other data storage media. The transmission line 106 can be an RS232 or a USB transmission line. Both the second processor 112 and the memory 102 are part of the embedded system 114.

The Second Embodiment of the Data Updating Apparatus

Figure 2:
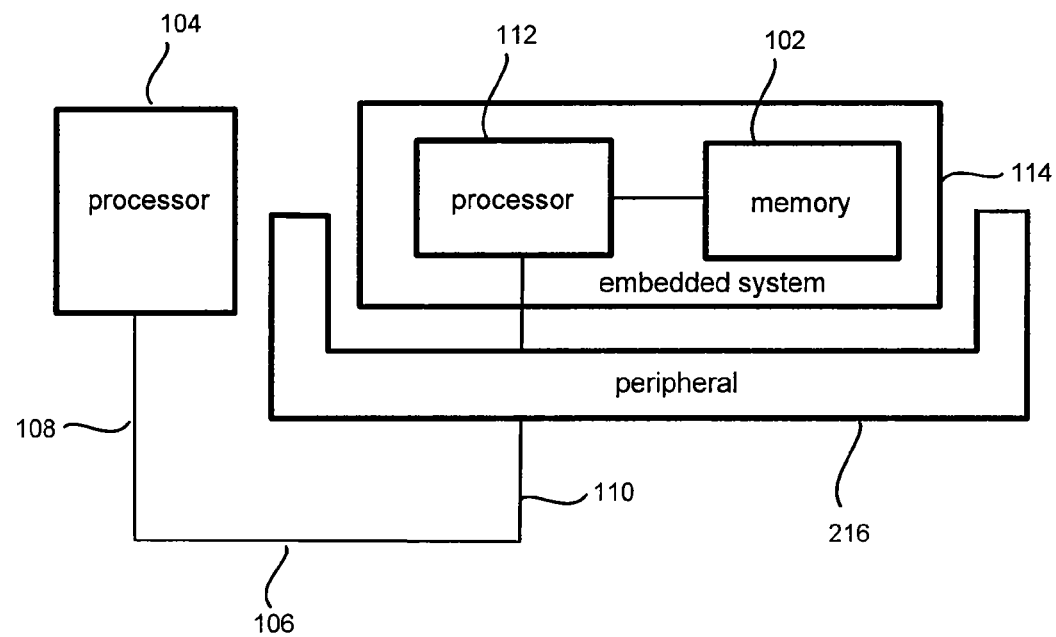
FIG. 2 shows a schematic diagram of the data updating apparatus of the second embodiment in the present invention.

FIG. 2 shows a schematic diagram of the data updating apparatus 200 of the second embodiment of the present invention. This apparatus 200 is similar to the apparatus 100, but this apparatus 200 includes a peripheral 216 additionally. The second end 110 of the data transmission line 106 is connected to the peripheral 216. The peripheral 216 is connected to the second processor 112. The second processor is connected to the memory. After the first processor 104 retrieves new data, the new data is transmitted via the transmission line 106 to the peripheral 216. The peripheral 216 transmits the new data to the second processor 112 and the second processor 112 writes it into the memory 102.

The peripheral 216 in the embodiment 200 can be connected to the second processor 112 by wireless transmission. The peripheral 216 includes a power charger to charge the embedded system 114.

The Embodiment of the Data Updating Method

The embodiment of the data updating method is used for updating data of the embedded system. We assume that the data has an end address A and a plurality of application programs, AP1, AP2, AP3 and AP4. The plurality of application programs are arranged in order and stored in the memory.

Figure 3:
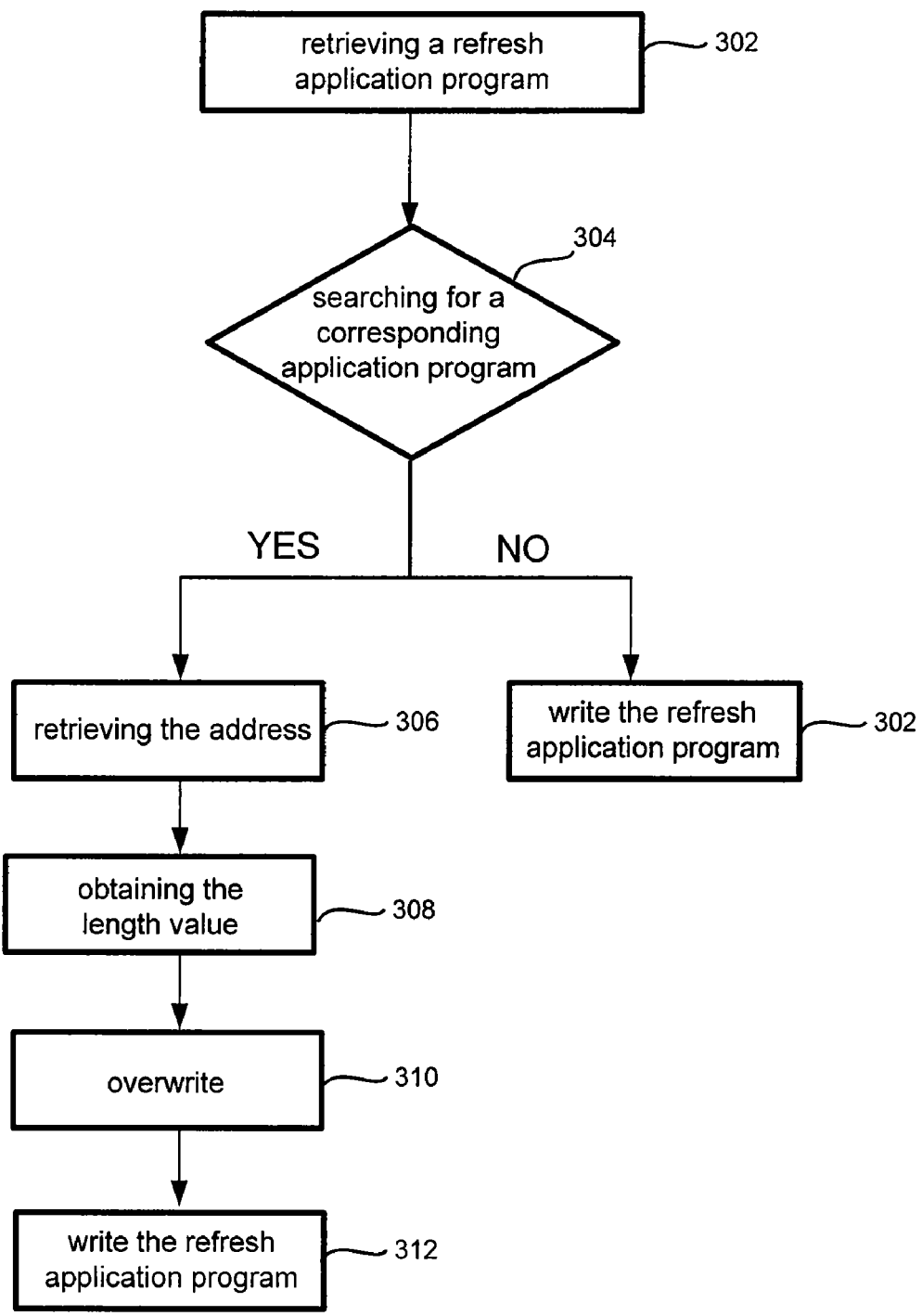
FIG. 3 shows a flow chart of the data updating method of the embodiment in the present invention.
Figure 4:
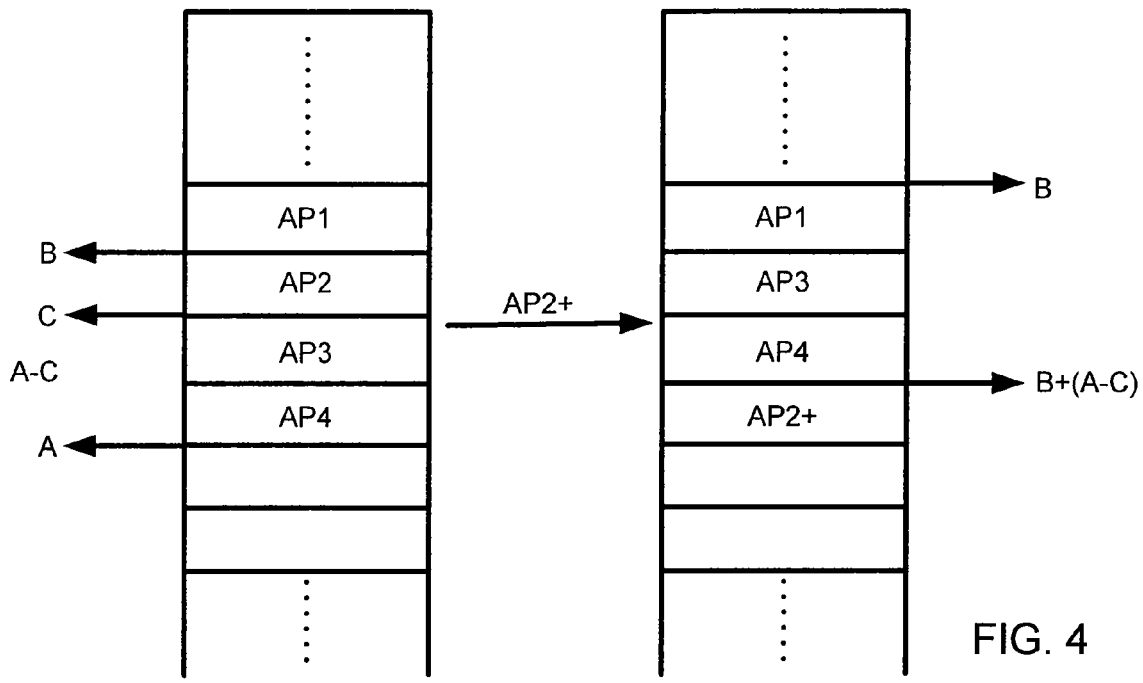
FIGS. 4 and 5 show schematic diagrams of the embodiment in FIG. 3 in the present invention.

First, please refer to FIGS. 3 and 4 at the same time. We assume that the application program update AP2+ corresponds to the application program AP2, and the updating steps are as follows. In the step 302, an updating application program AP2+ is retrieved from an external source. In the step 304, the system searches for the application program AP2 corresponding to the application program update AP2+ within the plurality of application programs. In the step 306, if the corresponding application program AP2 is found, a first address B and a second address C of the corresponding application program AP2 are retrieved. In the step 308, a length value (A−C) between the second address C and the end address A is obtained. In the step 310, the data stored between the second address C and the end address A (AP3 and AP4) is rewritten into the data area starting from the first address B. In the step 312, the length value (A−C) is added to the first address B to obtain a third address B+(A−C) and the application program update AP2+ is written into the data area starting from the third address B+(A−C).

Figure 5:
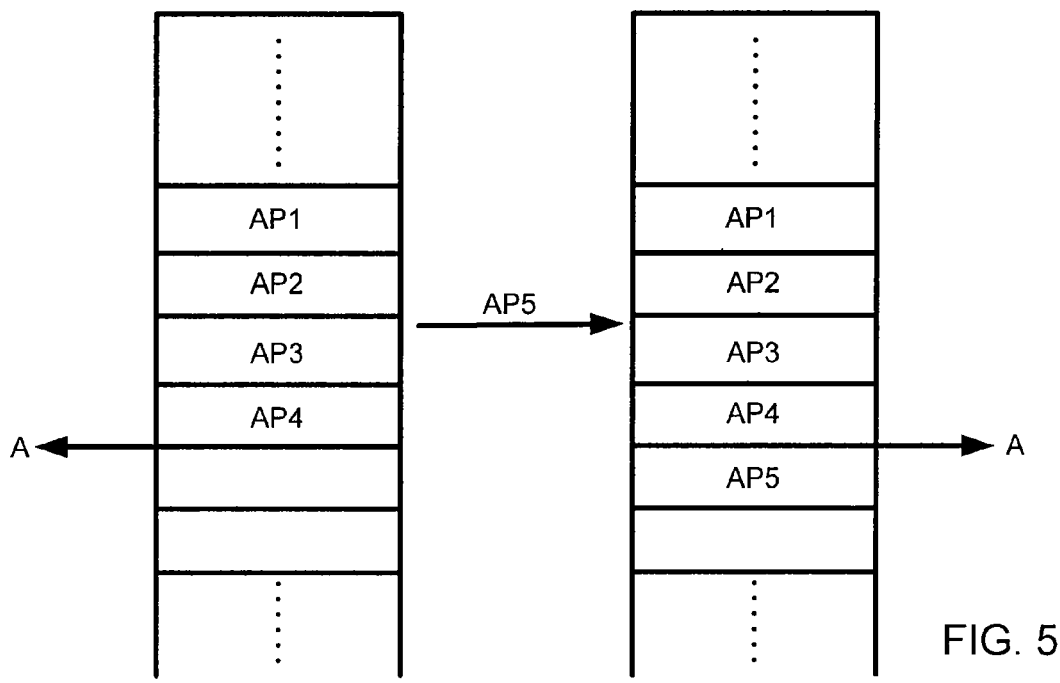

Please refer to FIGS. 3 and 5 at the same time. We assume that the application program update AP5 is a new application program and no corresponding application program is found in the step 304. In the step 314, the application program AP5 is written to the memory starting from the end address A.

As shown in FIGS. 4 and 5, an updating program stored in the memory can execute the aforementioned steps 304-314.

While the invention has been described in connection with what is presently considered to be the most practical and preferred embodiments, it is to be understood that the invention is not to be limited to the discovered embodiments. The invention is intended to cover various modifications and equivalent arrangements included within the spirit and scope of the appended claims.

What is claimed is:

1. An apparatus for updating data of an embedded system, the apparatus comprising:
a processor for retrieving a new data;
a transmission line, having a first end and a second end, the first end being connected to the processor to receive the new data, the second end communicating with the embedded system to transmit the new data to the embedded system;
wherein the data of a data area has a end address for the data and a plurality of application programs arranged in order, and the new data includes an application program update, and the embedded system executes steps as follows:
searching for an application program, within the plurality of application programs, corresponding to the application program update;
if the corresponding application program is found, retrieving a first address and a second address of the corresponding application program;
obtaining a length value of the corresponding application program from the second address and the end address;
writing contents of the data area from the second address to the end address into the data area beginning from the first address;
adding the first address to the length value to obtain a third address; and
writing the application program update into the data area beginning from the third address.

2. The apparatus according to claim 1, wherein the second end of the transmission line is connected to the embedded system.

3. The apparatus according to claim 1, further comprising a peripheral device connected to the second end of the transmission line to receive the new data, the peripheral device assisting the second end in communicating with the embedded system to transmit the new data to the embedded system.

4. The apparatus according to claim 3, wherein the peripheral device includes a power charger.

5. The apparatus according to claim 1, wherein the transmission line includes an RS232 transmission line.

6. The apparatus according to claim 1, wherein the transmission line includes a USB transmission line.

7. A method for updating a data of a data area of an embedded system, the data having an end address for the data, the data having a plurality of application programs arranged in order, the method comprising:
retrieving an application program update by a processor;
transmitting the application program update to the embedded system by a transmission line;
searching for an application program, within the plurality of application programs, corresponding to the application program update;

if the corresponding application program is found, retrieving a first address and a second address of the corresponding application program;

obtaining a length value of the corresponding application program from the second address and the end address;

writing contents of the data area from the second address to the end address into the data area beginning from the first address;

adding the first address to the length value to obtain a third address; and writing the application program update into the data area beginning from the third address.

8. The method according to claim 7, further comprising:

if the corresponding application program is not found, writing the application program update into the data area beginning from the end address.

9. An apparatus for updating data of a memory, the apparatus comprising:

a first processor for retrieving a new data;

a transmission line, having a first end and a second end, the first end being connected to the first processor; and a second processor for communicating with the second end of the transmission line, the second processor being connected to the memory;

wherein the transmission line receives the new data from the processor and transmits the new data to the second processor to write the new data into the memory;

and wherein the data of a data area has a end address for the data and a plurality of application programs arranged in order, and the new data includes an application program update, and the second processor executes steps as follows:

searching for an application program, within the plurality of application programs, corresponding to the application program update;

if the corresponding application program is found, retrieving a first address and a second address of the corresponding application program;

obtaining a length value of the corresponding application program from the second address and the end address;

writing contents of the data area from the second address to the end address into the data area beginning from the first address;

adding the first address to the length value to obtain a third address; and writing the application program update into the data area beginning from the third address.

10. The apparatus according to claim 9, wherein the second end of the transmission line is connected to the second processor.

11. The apparatus according to claim 9, further comprising a peripheral device connected to the second end of the transmission line to receive the new data, the peripheral device assisting the second end in communicating with the second processor to transmit the new data to the second processor.

12. The apparatus according to claim 11, wherein the peripheral device includes a power charger.

13. The apparatus according to claim 9, wherein the transmission line includes an RS232 transmission line.

14. The apparatus according to claim 9, wherein the transmission line includes a USB transmission line.

15. The data updating apparatus according to claim 9, wherein if the corresponding application program is not found, write the application program update into the data area beginning from the end address.

* * * * *